Aug. 31, 1965   R. B. WILSON ETAL   3,203,334
PHOTOGRAPHIC FILM CROPPING DEVICE
Filed March 5, 1962
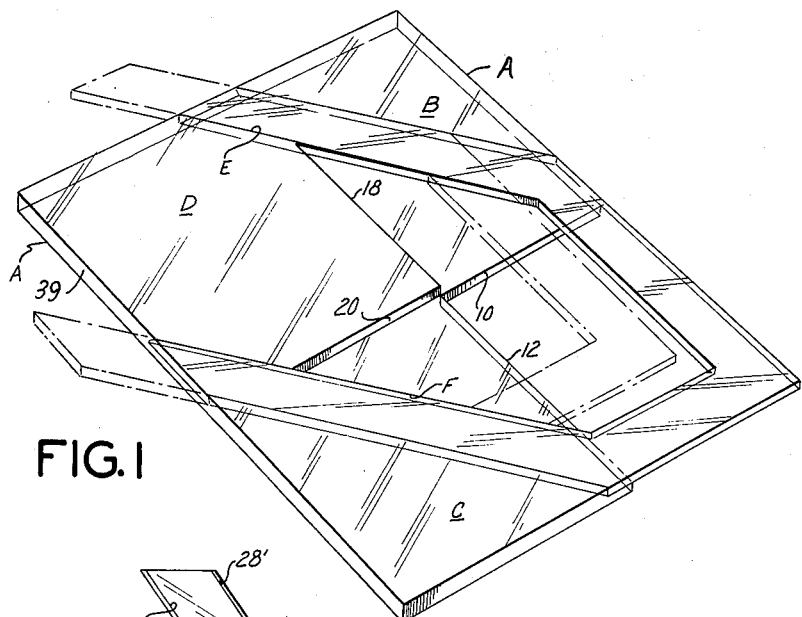
FIG. 1
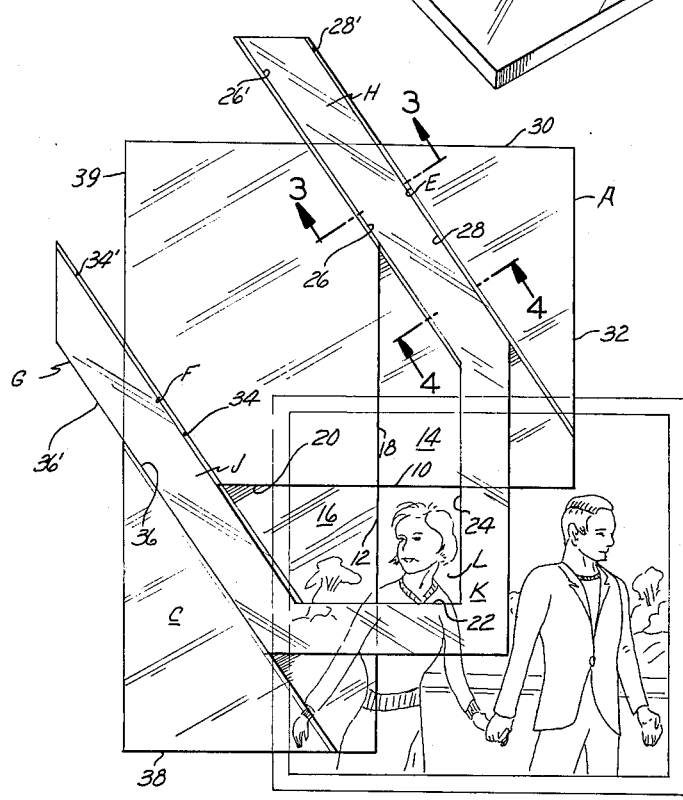
FIG. 2
FIG. 3
FIG. 4
INVENTORS.
ROSS B. WILSON
C. WILLIAM BOWERS
BY
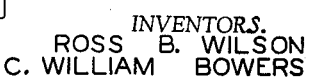
ATTORNEY

United States Patent Office 3,203,334
Patented Aug. 31, 1965

3,203,334
PHOTOGRAPHIC FILM CROPPING DEVICE
Ross B. Wilson and C. William Bowers, both of 645 Westbourne Drive, Los Angeles 69, Calif.
Filed Mar. 5, 1962, Ser. No. 177,351
2 Claims. (Cl. 95—79)

The present invention relates generally to the field of photography, and more particularly to a device for use in cropping photographic film.

Frequently in commercial photography a photograph is taken in which a particular portion thereof is of outstanding quality or embodies certain characteristics that are desirable, with this portion being far superior to the balance of the photograph. When it is desired to reproduce this portion of the photograph, the problem is encountered of just how much of the background material should be included therewith. Selection of the desired portion of the photograph, together with the accompanying background is commonly referred to as cropping. However, to crop a photograph without the skill of long experience, one is inclined to either include too much or too little of the background with the desired subject matter. Consequently, most amateur film cropping is usually of poor quality due to the amateur's inability to visualize the end result.

A primary object of the present invention is to provide a device of extremely simple structure which is adapted to adjustably form a rectangular opening therein of variable size, which when overlaid on a photographic film permits the selection of a desired portion thereof for cropping.

Another object of the invention is to furnish a structurally simple device which is compact, lightweight, and can be easily utilized by one having little experience in cropping photographic film.

Another object of the invention is to provide a film cropping device that can be fabricated from standard commercially available materials, is inexpensive to produce, and can be sold at a sufficiently low price as to encourage its widespread use.

These and other objects and advantages of the invention will become apparent from the following description of a preferred form thereof, and from the accompanying drawing illustrating that form, in which:

FIGURE 1 is a perspective view of the cropping device of the present invention;

FIGURE 2 is a top plan view of the cropping device overlying a photograph showing the variable opening in the device so adjusted as to define the boundaries of a portion of the photograph that is to be cropped;

FIGURE 3 is a transverse cross-sectional view of the device taken on the line 3—3 of FIGURE 2; and FIGURE 4 is a transverse cross-sectional view of the device taken on the line 4—4 of FIGURE 2.

Referring now to FIGURE 1 of the drawing for the general arrangement of the invention, it will be seen to include an L-shaped first sheet A that has a first rectangular leg B, a second rectangular leg C, and a central portion D which is located between the first and second legs. The first leg B and second leg C have adjoining straight edges 10 and 12 that are disposed in a direction normal relative to one another.

The first sheet A has first and second laterally spaced, diagonally positioned grooves E and F formed therein, as may best be seen in FIGURES 1 and 2. The first groove E is in communication with a rectangular recessed portion of the first leg B that is identified generally by the numeral 14. The second groove F likewise communicates with a second recessed portion 16 formed on the second leg C. Portions 14 and 16, together with the central portion D, define first and second straight body shoulders 18 and 20 respectively, at the junction thereof, as best seen in FIGURE 1. The purpose of shoulders 18 and 20 will be described hereinafter.

The cropping device also includes a generally U-shaped member G shown in FIGURE 2, that includes first and second legs H and J respectively. Legs H and J are laterally separated and parallel to one another. An L-shaped web K connects legs H and J, and this web defines third and fourth straight edges 22 and 24 which are parallel to edges 10 and 12 respectively.

The first groove E has undercut side edges 26 and 28, with edge 28 extending from the edge 30 of sheet A to the edge 32 thereof, as illustrated in FIGURE 2. The second groove F has undercut side edges 34 and 36 as also shown in this figure, and edge 34 extends from shoulder 20 of portion D to edge 39 thereof. Leg H has two side edges 28' and 26' that taper outwardly and downwardly and slidably interlock with the undercut edges 26 and 28. Leg J also has downwardly and outwardly tapering side edges 34' and 36' which slidably interlock with the undercut edges 34 and 36 of groove F. It will be seen from the drawing that the sheet A and the U-shaped member G, due to the arrangement of the first and second edges 10 and 12 relative to the third and fourth edges 22 and 24 respectively, cooperatively provide a variable rectangular opening L of variable area, but one in which the proportion between the sides and edges thereof remains constant.

When the device overlies a photograph M such as shown in FIGURE 2, the member G may be moved relative to sheet A to place the opening L over a desired portion of the photograph. Inasmuch as the device overlies the photograph M, the photograph may be either larger or smaller in area than that of first sheet A. Thereafter, by adjusting the position of member G relative to sheet A, the size of the opening L may be varied to determine the extent of the background material most suitable for inclusion in the cropped portion of the photograph. From experience it has been found desirable for at least that portion of the sheet A adjacent the first and second edges 10 and 12 to be transparent as an aid in determining the extent of background material in the photograph M which it would be most advantageous to include in the section cropped therefrom. Also, it is desirable that a portion of the web K adjacent the third and fourth edges 22 and 24 respectively be transparent for the same reasons as given above in connection with sheet A. It will be apparent that the device shown in FIGURES 1 and 2 may be fabricated from a number of different materials, but it has been found desirable to fabricate sheet A as well as the U-shaped member G from a polymerized resin that is transparent.

In FIGURE 2 it will be seen that the shoulders 18 and 20 act as a stop to prevent further upward movement of member G when the edges 24 and 22 of the member come into contact with the shoulders.

The operation of the cropping device has been described in detail hereinabove and need not be repeated.

Although the present invention is fully capable of achieving the objects and providing the advantages hereinbefore mentioned, it is to be understood that it is merely illustrative of the presently preferred embodiments thereof and we do not mean to be limited to the details of construction herein shown and described, other than as defined in the appended claims.

We claim:
1. A film cropping device that defines a rectangular opening of variable area for use in adjustably selecting a desired portion of a photograph of any dimension for reproduction, which device includes:

(a) an L-shaped sheet of transparent rigid material having a central portion and first and second legs projecting therefrom, said first and second legs having first and second edges which are disposed adjacent and in a direction normal to one another, which sheet has first and second parallel laterally spaced grooves formed therein that are in communication with first and second recesses formed in said first and second legs which extend outwardly therein to said first and second edges, said central portion and said first and second recesses cooperatively defining first and second straight body shoulders at the junction thereof that are parallel to said first and second edges respectively, which first and second grooves have undercut edges with said L-shaped sheet being adapted to be disposed to overlie all or a portion of said photograph without obstructing the view thereof; and (b) a generally U-shaped member including first and second parallel legs and a web that connects adjoining ends thereof, said first and second legs having tapered side edges which slidably engage said undercut edges, which web defines third and fourth straight edges that are parallel to said first and second edges respectively, with said third and fourth edges contacting said first and second shoulders when said member has been moved inwardly a predetermined distance relative to said sheet to prevent inadvertent displacement of said member from said sheet, said sheet and member cooperatively providing a rectangular opening of variable size but constant proportion between the sides and edges thereof that is bounded by said first, second, third and fourth edges, which opening decreases and increases in cross section as said member is moved towards and away from said plate, and with that portion of said photograph inside said opening presenting the appearance of said photograph after the same is cropped.

2. A photographic film cropping device as defined in claim 1 wherein at least that portion of said web adjacent said third and fourth edges is transparent.

References Cited by the Examiner

UNITED STATES PATENTS 2,246,920 6/41 Kromholz _____ 95—79 X
2,342,525 2/44 Berry _____ 95—79 X NORTON ANSHER, *Primary Examiner.*

D. B. LOWE, *Examiner.*